United States Patent
Bruguera

(10) Patent No.: US 10,216,481 B2
(45) Date of Patent: Feb. 26, 2019

(54) DIGIT RECURRENCE DIVISION WITH SCALING AND DIGIT SELECTION USING INTERMEDIATE VALUE

(71) Applicant: ARM Limited, Cambridge (GB)

(72) Inventor: Javier Diaz Bruguera, Austin, TX (US)

(73) Assignee: ARM Limited, Cambridge (GB)

( * ) Notice: Subject to any disclaimer, the term of this patent is extended or adjusted under 35 U.S.C. 154(b) by 18 days.

(21) Appl. No.: 15/409,749

(22) Filed: Jan. 19, 2017

(65) Prior Publication Data

US 2018/0203669 A1  Jul. 19, 2018

(51) Int. Cl.
*G06F 7/491* (2006.01)
*G06F 7/535* (2006.01)

(52) U.S. Cl.
CPC ............ *G06F 7/4917* (2013.01); *G06F 7/535* (2013.01)

(58) Field of Classification Search
CPC .................................................... G06F 7/4917
See application file for complete search history.

(56) References Cited

PUBLICATIONS

M.D. Ercegovac, et.al., Simple Radix-4 Division with Divisor Scaling, IEEE Transactions on Computers, vol. 39, No. 9, 1990 (Year: 1990).*
M.D. Ercegovac, et.al., Implementation of Fast Radix-4 Division with Operands Scaling, 1988 IEEE Internation Confernece on Computer Design: VLSI, IEEE 1988 (Year: 1988).*
E. Rice, et.al., a New Iterative Structure for Hardware Division: the Parallel Paths Algorithm, Proceedings of the 16th IEEE Symposium on Computer Arithmetic, 2003 (Year: 2003).*

* cited by examiner

*Primary Examiner* — Keith E Vicary
*Assistant Examiner* — Emily E Larocque
(74) *Attorney, Agent, or Firm* — Nixon & Vanderhye P.C.

(57) ABSTRACT

A data processing apparatus is provided to perform a digit-recurrence division operation to determine a quotient as a result of dividing a dividend by a divisor. Scaling circuitry scales the dividend and the divisor by a factor to produce a scaled dividend and a scaled divisor. Digit recurrence circuitry performs one or more iterations of the digit-recurrence division operation on the scaled dividend and the scaled divisor, with each iteration producing a digit of the quotient and a remainder value. The remainder value is provided as an input to the digit recurrence circuitry for a subsequent iteration. Initialization circuitry performs a first iteration of the one or more iterations and provides the digit of the quotient after the first iteration. The initialization circuitry receives, as an input, an intermediate value produced by the scaling circuitry while scaling the dividend.

11 Claims, 4 Drawing Sheets

DIGIT RECURRENCE DIVISION WITH SCALING AND DIGIT SELECTION USING INTERMEDIATE VALUE

TECHNICAL FIELD

The present disclosure relates to data processing. For example, the present disclosure has relevance to the field of division using digit recurrence.

DESCRIPTION

Digit-recurrence is a type of iterative algorithm for performing a computation. Each iteration, a new digit of an output is produced. Each digit is represented by a number of bits. In a radix r implementation, a digit is $\log_2(r)$ bits. For example, in an implementation with a radix of 4, each digit represents two bits and so at each iteration, two bits would be output. The number of iterations required to produce the end result is equal to the number of bits of the result divided by the number of bits produced at each iteration. As the radix increases, a small number of iterations is required in order to produce the same output, but the circuitry becomes more complex.

Digit-recurrence may be used for performing division on floating point numbers. At each iteration, a digit of the result is produced. Once the desired level of accuracy has been reached, the final result can be output. We refer to the output of the final iteration as the quotient. However, note that this may not be exact, since it may not be possible to represent the quotient exactly in binary format. We also refer to the output of any other iteration as a partial quotient, since the desired number of bits has not been output. This is true even if the partial quotient is exact.

Performing a division in this manner can be time consuming. Accordingly, it is desirable to speed up the process, where possible, ideally without increasing the complexity of the circuitry, which would increase power consumption and the size of the circuitry.

SUMMARY

Viewed from a first example configuration, there is provided a data processing apparatus configured to perform a digit-recurrence division operation to determine a quotient as a result of dividing a dividend by a divisor, the data processing apparatus comprising: scaling circuitry to scale said dividend and said divisor by a factor to produce a scaled dividend and a scaled divisor; digit recurrence circuitry to perform one or more iterations of said digit-recurrence division operation on said scaled dividend and said scaled divisor, each iteration producing a digit of said quotient and a remainder value, wherein said remainder value is provided as an input to said digit recurrence circuitry for a subsequent iteration; and initialisation circuitry to perform a first iteration of said one or more iterations and to provide said digit of said quotient after said first iteration, wherein said initialisation circuitry receives, as an input, an intermediate value produced by said scaling circuitry while scaling said dividend.

Viewed from a second example configuration, there is provided a method of data processing apparatus to determine a quotient as a result of dividing a dividend by a divisor, the method comprising: scaling said dividend and said divisor by a factor to produce a scaled dividend and a scaled divisor; performing one or more iterations of said digit-recurrence division operation on said scaled dividend and said scaled divisor, each iteration producing a digit of said quotient and a remainder value, wherein said remainder value is provided as an input for a subsequent iteration; and using, in a first iteration of said one or more iterations, an intermediate value produced during said scaling of said dividend, as an input.

Viewed from a third example configuration, there is provided a data processing apparatus configured to perform a digit-recurrence division operation to determine a quotient as a result of dividing a dividend by a divisor, the data processing apparatus comprising: means for scaling said dividend and said divisor by a factor to produce a scaled dividend and a scaled divisor; means for performing one or more iterations of said digit-recurrence division operation on said scaled dividend and said scaled divisor, each iteration producing a digit of said quotient and a remainder value, wherein said remainder value is provided as an input for a subsequent iteration, wherein in a first iteration of said one or more iterations, an intermediate value produced during said scaling of said dividend, is provided as an input.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
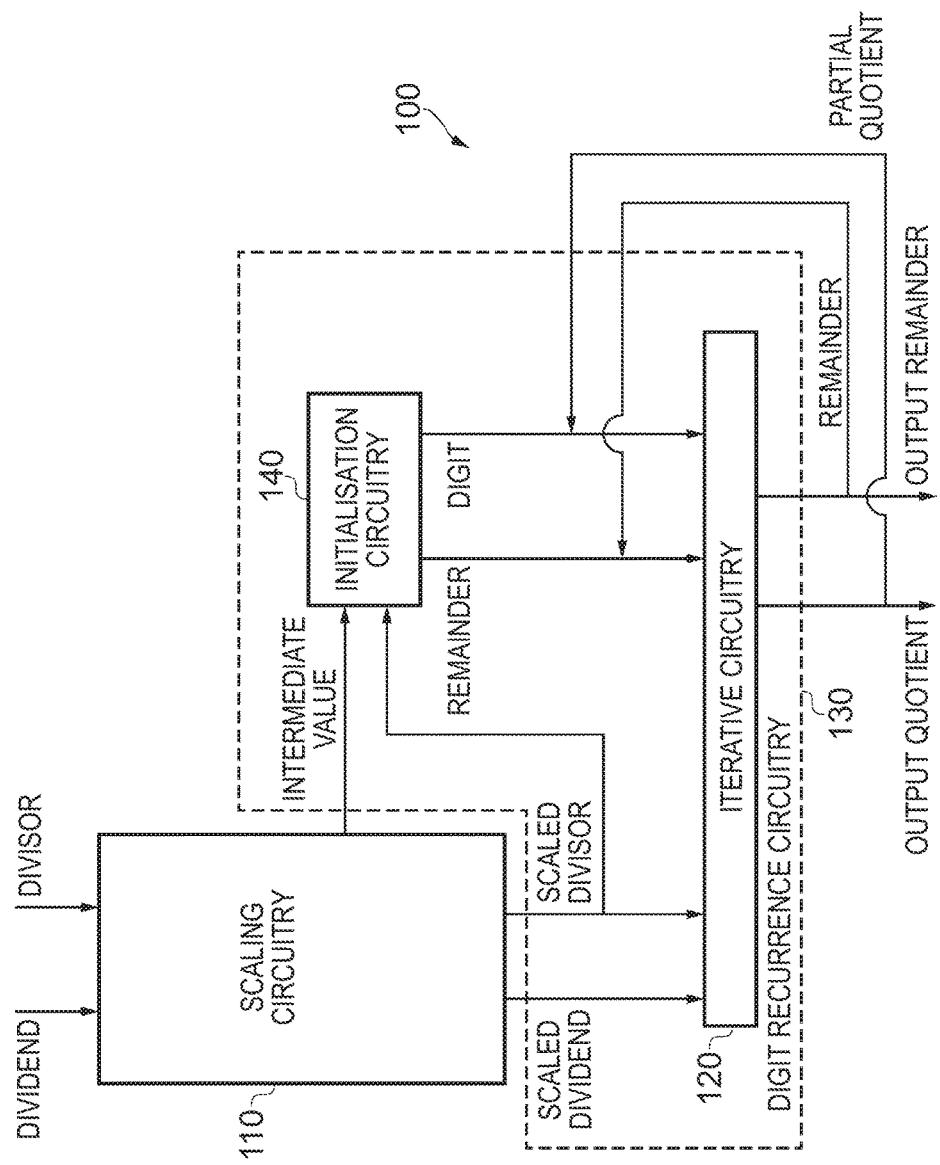
FIG. 1 illustrates, in schematic form, an example of a data processing apparatus in accordance with one embodiment.

Before discussing the embodiments with reference to the accompanying figures, the following description of embodiments is provided.

In accordance with one example configuration there is provided a data processing apparatus configured to perform a digit-recurrence division operation to determine a quotient as a result of dividing a dividend by a divisor, the data processing apparatus comprising: scaling circuitry to scale said dividend and said divisor by a factor to produce a scaled dividend and a scaled divisor; digit recurrence circuitry to perform one or more iterations of said digit-recurrence division operation on said scaled dividend and said scaled divisor, each iteration producing a digit of said quotient and a remainder value, wherein said remainder value is provided as an input to said digit recurrence circuitry for a subsequent iteration; and initialisation circuitry to perform a first iteration of said one or more iterations and to provide said digit of said quotient after said first iteration, wherein said initialisation circuitry receives, as an input, an intermediate value produced by said scaling circuitry while scaling said dividend.

Digit-recurrence division operations often rely on the divisor being close to 1. The permissible offset or distance from 1 depends on the radix being used. In order to get the divisor within the permissible range, it is necessary to scale the divisor. Consequently, in order to avoid changing the result of the division operation, the dividend should also be scaled by the same amount. This pre-scaling operation can take a cycle to complete and since the result is used in the digit recurrence division operation, the pre-scaling typically occurs before the digit-recurrence division operation begins. In accordance with the above, however, the pre-scaling operation produces an intermediate value. This intermediate value can be used to perform a first iteration of the digit-recurrence division operation and produce a partial quotient before the scaled divisor or scaled dividend are produced. Consequently, a speed-up of the overall process can be achieved.

In some embodiments, said intermediate value is said scaled dividend in redundant representation. Redundant-representation is a technique in which a value is represented as a pair of words, for example a positive word and a negative word. In this example, the overall value can be determined by subtracting the negative word from the positive word. As another example, the pair of words could be a sum word and a carry word, i.e. the output from a carry-save adder. In this case, the overall value can be determined by adding the two values together. Redundant-representation is an efficient way of representing a value for some circuits.

In some embodiments, said scaling circuitry comprises dividend scaling circuitry to scale said dividend by said factor to produce said scaled dividend; said dividend scaling circuitry comprises component selection circuitry to select a subset of components from a set of components, and addition circuitry to add said plurality of components together to produce said scaled dividend, wherein each component in said set of components is equal to said dividend divided by a power of two. In some cases, such as for a radix of four, the divisor can be multiplied by the factor by adding together the divisor and one or two multiples of the divisor—with each of the multiples being a power of two. In this way, the scaling can be achieved by performing an addition, rather than by performing a more time consuming multiplication process.

In some embodiments, said addition circuitry comprises a carry save adder to add said subset of components to produce said intermediate value; and said addition circuitry comprises an adder to convert said intermediate value into said scaled dividend. In this way, it is possible to both efficiently perform part of the scaling process on the dividend and also provide the intermediate value so that the partial quotient of the first iteration can be determined before the non-redundant form of the dividend is calculated.

In some embodiments, said factor is selected in dependence on said divisor and a radix of said digit-recurrence division operation. For example, the permissible offset of the divisor from 1 will depend on the radix. Meanwhile, the actual value of the divisor controls the scaling factor that is necessary in order to move the scaled divisor to within the permissible offset. For example, in some embodiments, such as where the radix is four, said factor is selected such that said scaled divisor is in the range $[1-\frac{1}{64}, 1+\frac{1}{8}]$.

In some embodiments, said initialisation circuitry is configured to operate substantially in parallel with said scaling circuitry. For example, at least part of the operation of the initialisation circuitry may, in some embodiments, occur at the same time as (e.g. overlap) the operation of the scaling circuitry. In some embodiments, all of the operation of the initialisation circuitry may occur at the same time as the operation of the scaling circuitry.

In some embodiments, said initialisation circuitry is configured to provide said digit before said scaling circuitry provides said scaled dividend, i.e. in a non-redundant representation. In some other embodiments, said initialisation circuitry is configured to provide said digit before said scaling circuitry provides said scaled divisor, i.e. in a non-redundant representation.

In some embodiments, said initialisation circuitry is configured to additionally provide said remainder after said first iteration, based on said scaled divisor and said digit. The initialisation circuitry may, after having determined the partial quotient after the first iteration (e.g. the first digit), determine the remainder after the first iteration.

In some embodiments, said initialisation circuitry is configured to provide said remainder after said scaling circuitry provides said scaled divisor. The remainder after the first iteration (rem[1]) is dependent on the remainder of the previous iteration (rem[0]), which is defined as the scaled divisor. Note that in some other embodiments, said initialisation circuitry is configured to provide said remainder after said scaling circuitry provides said scaled dividend since if the divisor scaling circuitry and the dividend scaling circuitry operate in parallel, they would produce the scaled divisor and the scaled dividend at approximately the same time.

Particular embodiments will now be described with reference to the figures.

FIG. 1 illustrates a data processing apparatus 100 for performing digit recurrence division of a (normalised floating point) dividend by a (normalised floating point) divisor. In practice, the circuitry is only concerned with the significands of the dividend and the divisor. However, in different embodiments, the entire floating point number or just the significands will be provided. For convenience, we will refer to the dividend and the divisor rather than the significand of the normalised floating point dividend and the significand of the normalised floating point divisor, respectively. The dividend and the divisor are received by scaling circuitry 110. The scaling circuitry 110 performs a scaling operation in order to scale the divisor so that it is close to 1. In order that the end result is not changed as a consequence, the divisor is scaled by the same amount. The output of the scaling circuitry 110 is therefore the scaled divisor and the scaled dividend, that are provided to iterative circuitry 120 belonging to digit recurrence circuitry 130. Partway through the scaling operation performed by the scaling circuitry 110, an intermediate value is output to initialisation circuitry 140 which also makes up part of the digit recurrence circuitry 130. The initialisation circuitry 140 performs a first iteration of the digit recurrence division algorithm. The intermediate value enables the initialisation circuitry 140 to output a first digit (of the partial quotient) after a first iteration, before either the scaled dividend or the scaled divisor are output by the scaling circuitry 110. In addition, the initialisation circuitry 140 receives the scaled divisor and, using this, outputs the remainder after the first iteration. The remainder and partial quotient produced by the initialisation circuitry are then passed to the iterative circuitry 120, which performs any further iterations of the digit recurrence division algorithm. At each iteration, the iterative circuitry 120 outputs a partial quotient and a remainder, both of which are provided as inputs back to the iterative circuitry 120 to complete a further iteration. After the desired level of accuracy has been achieved, the quotient and the remainder value are provided as an output quotient and an output remainder. These values may then be provided to rounding circuitry in order to round the output quotient and provide a final result to the division operation.

By virtue of providing the intermediate value from the scaling circuitry 110 to the initialisation circuitry 140, it is possible for the initialisation circuitry to produce the digit (from a first iteration) prior to the scaled divisor and/or scaled dividend being output by the scaling circuitry. In this way, the operation of the scaling circuitry occurs substantially in parallel with the operation of the initialisation circuitry, thereby reducing the time to perform the digit recurrence division algorithm as compared to an embodiment where the scaling is completed before performing the first iteration.

Figure 2:
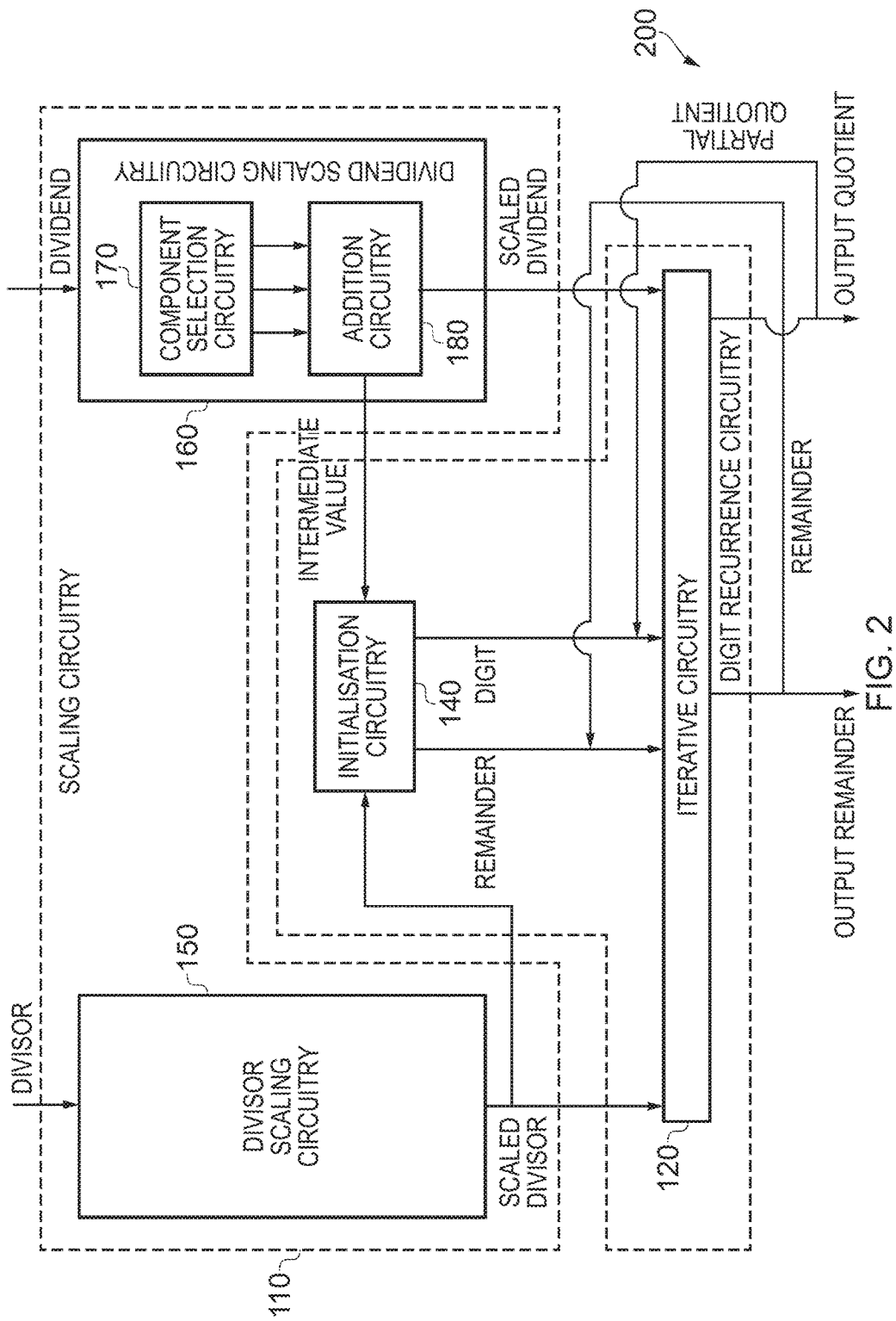
FIG. 2 illustrates, in schematic form, an example of a data processing apparatus with an example structure of the scaling circuitry, in accordance with one embodiment.

FIG. 2 illustrates a data processing apparatus 200 in accordance with one embodiment. In this embodiment, the scaling circuitry 110 has been divided into divisor scaling circuitry 150, which produces a scaled divisor from the divisor, and dividend scaling circuitry 160, which produces a scaled dividend from the dividend. The dividend circuitry is made up of component selection circuitry 170, which selects a subset of components from a set of components, each of the components being equal to the divisor multiplied by a power of two. The selected components are then passed to addition circuitry 180. In this way, the scaling of the dividend is accomplished without performing a multiplication operation. During the process carried out by the addition circuitry, an intermediate value is passed to the initialisation circuitry 140 as before, which determines a first digit of the output quotient and a remainder after a first iteration of the digit-recurrence algorithm. This occurs substantially in parallel with the remaining operations performed by the addition circuitry 180. The remainder and digit calculated by the initialisation circuitry 140, as well as the scaled dividend and the scaled divisor are passed to iterative circuitry 120. The iterative circuitry 120 performs further iterations of the digit recurrence algorithm. At each iteration, the partial quotient and remainder are output and passed back to the iterative circuitry 120 as an input for a further iteration. As before, once the desired level of accuracy of the partial quotient has been achieved (i.e. once a sufficient number of digits or bits have been output), the output quotient and output remainder can be produced. These can then be passed to rounding circuitry, as necessary.

The divisor scaling circuitry 150 may, in some embodiments, work in the same way as the dividend scaling circuitry 160, i.e. by the use of component selection circuitry 170 and addition circuitry 180 in order to avoid performing a multiplication operation, which may be time consuming.

Figure 3:
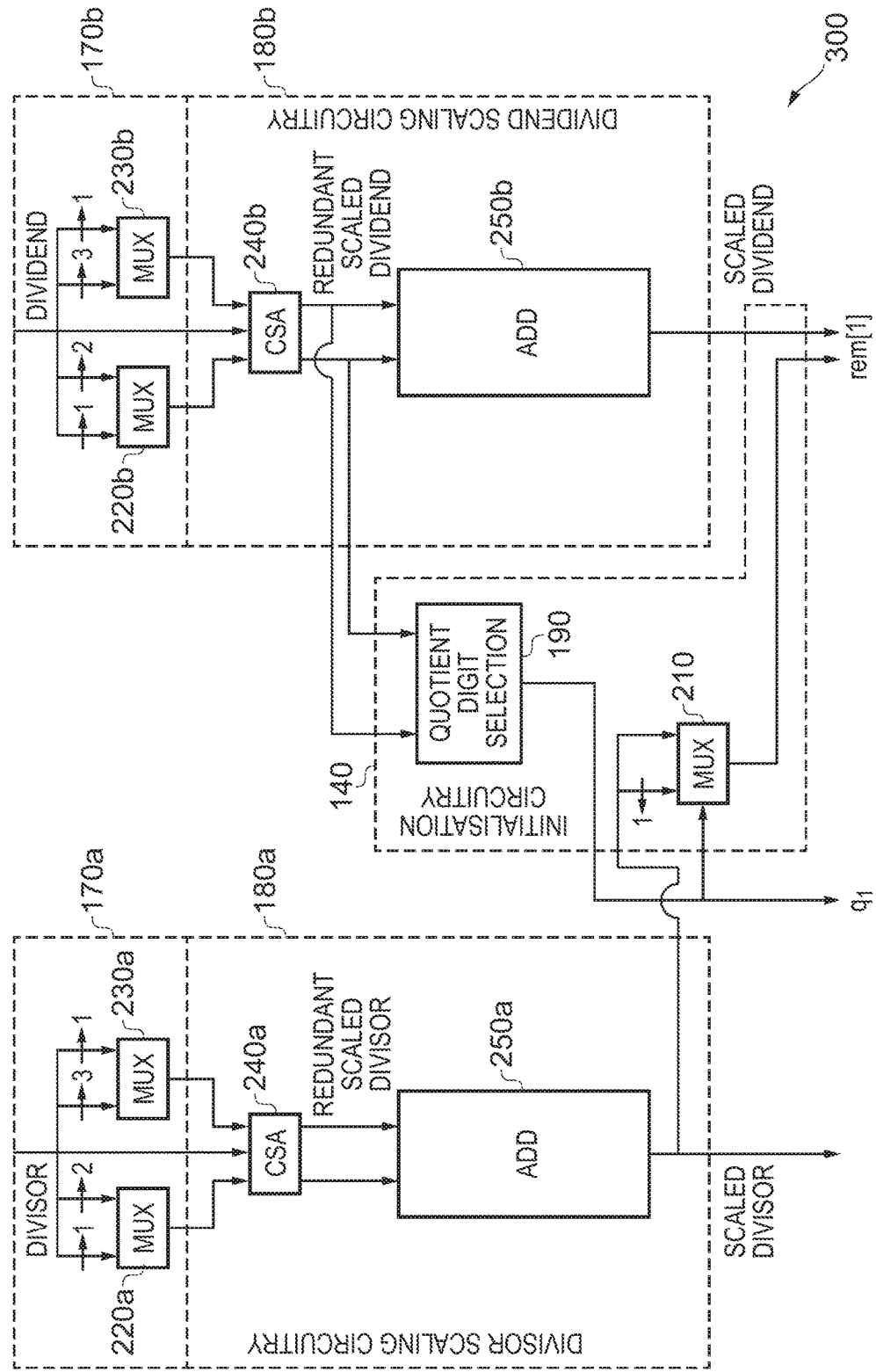
FIG. 3 illustrates, in schematic form, an example of a data processing apparatus with an example structure of the initialisation circuitry, in accordance with one embodiment.

FIG. 3 illustrates a data processing apparatus 300 in accordance with one embodiment. In this embodiment, the divisor is input to component selection circuitry 170a of divisor scaling circuitry. A first multiplexer 220a receives the divisor right shifted once and the divisor right shifted twice (i.e. the divisor multiplied by 0.5 and the divisor multiplied by 0.25). A second multiplexer 230a receives the divisor right shifted three times and the divisor right shifted once (i.e. the divisor multiplied by 0.125 and the divisor multiplied by 0.5). Each of the multiplexers 220a, 230a outputs one of these values. Therefore, the two values output by the multiplexers 220a, 230a and the divisor itself are passed to a carry save adder 240a. The carry save adder 240a adds the terms together, providing the result in a carry-save redundant representation. This is then passed to adder circuitry 250a, which adds the terms together in order to produce the scaled divisor in non-redundant representation. Similarly, in the component selection circuitry 170b of the dividend scaling circuitry, a first multiplexer 220b receives the dividend right shifted once and the dividend right shifted twice (i.e. the dividend multiplied by 0.5 and the dividend multiplied by 0.25). A second multiplexer 230b receives the divisor right shifted three times and the divisor right shifted once. The output of these multiplexers 220b, 230b and the divisor itself are then provided to a carry save adder 240b. The carry save adder 240b adds the terms together, providing the result in a carry-save redundant representation. This is then provided as the intermediate value to quotient digit selection circuitry 190 of the initialisation circuitry 140. In addition, the result is passed to adder circuitry 250b, which adds the two terms together in order to output a scaled dividend.

The set of components that is provided to the multiplexers 220a, 230a, 220b, 230b is dependent on the radix used as described by M. D. Ercegovac and T. Lang. in Simple Radix-4 Division with Operand Prescaling, IEEE Transactions on Computers, Vol. 39, No. 9, pp. 1204-1208. 1990, the contents of which are incorporated in their entirety. Here, the radix is four. Accordingly, it is sufficient for the scaled divisor to be in the range [1−¹⁄₆₄, 1+⅛]. The divisor is multiplied by a scaling factor $M=1+b2^{-3}$, with $0 \leq b \leq 8$, $b \neq 7$. In practice, for a radix of four, only three bits of the divisor need to be checked in order to determine the scaling factor, as shown in the table below.

| Divisor = $0.1x_1x_2x_3 \ldots$ | M |
| --- | --- |
| 000 | 1 + ½ + ½ |
| 001 | 1 + ¼ + ½ |
| 010 | 1 + ½ + ⅛ |
| 011 | 1 + ½ |
| 100 | 1 + ¼ + ⅛ |
| 101 | 1 + ¼ |
| 110 | 1 + ⅛ |
| 111 | 1 + ⅛ |

It will be appreciated, therefore, that the set of components includes the divisor, the divisor multiplied by ½, the divisor multiplied by ¼, and the divisor multiplied by ⅛. In each case, a subset of these components is added together to give the final scaled divisor. Since the dividend must be multiplied by the same scaling factor (in order to avoid altering the end result), the same set of components and subset of components is used for the dividend. Accordingly, the selection signal provided to multiplexers 220a, 220b will be the same, and the selection signal provided to multiplexers 230a, 230b will be the same. In each of the cases outlined above, the divisor is always one of the components. The second component is either the divisor multiplied by ½ or ¼ and the third component (if used) is either the divisor multiplied by ⅛ or ½. Where the third component is unused, none of the inputs to the multiplexer is selected. Similarly, in the case of the dividend, the dividend itself is always one of the components. The second component is either the dividend multiplied by ½ or ¼ and the third component (if used) is either the divisor multiplied by ⅛ or ½. In this way, rather than performing a multiplication of the divisor (and the dividend) by a number, it is possible to achieve the same effect using only shifting and addition.

The quotient digit selection circuitry 190 receives the redundant scaled dividend from the carry save adder 250 of the dividend scaling circuitry. Because the divisor has been scaled to be close to 1, the quotient digit selection algorithm for radix r becomes:

$$q_{i+1} = \mathrm{SEL}(r \, \widehat{rem}[i])$$

Where $q_{i+1}$ is the digit of the next iteration, which for most iterations using radix four is one of the values $\{-2, -1, 0, +1, +2\}$, SEL is the selection function, r is the radix, and $\widehat{rem}[i]$ is an estimate of the remainder from the previous iteration, produced by taking the most significand bits of the remainder from the previous iteration. The number of most significant bits taken is dependent on the radix. For a radix of 4, three integer bits and three fractional bits are used. Note that rem[0] is simply the scaled dividend itself. Hence, for the first iteration, $q_{i+1}$ is dependent on the scaled dividend.

The selection function SEL checks the most-significant bits of the signed-digit remainder to obtain the next quotient digit. The number of bits needed for the selection depends basically on the radix being used. For a radix 4 division, 6 bits of the remainder, the 3 integer bits and 3 fractional bits are checked. In a radix-4 implementation, SEL works as follows. Every iteration an estimate of the remainder, using the 6 most-significant bits, is obtained. This estimate is 2's complement number. The selection function consists on to compare the 6-bit remainder estimate with 4 comparison constants, $m_k$, k=2, 1, 0, −1, in such a way that the quotient digit is $q_{i+1}$=k if $\widetilde{rem}[i] \geq m_k$ and $\widetilde{rem}[i] < m_{k+1}$. In radix 4 the comparison constants are $m_2$=13/8, $m_1$=4/8, $m_0$=−3/8, and $m_{-1}$=−12/8. Note that the number of bits of the remainder estimate and the comparison constants differ for other values of the radix.

The divisor and the dividend are both significands of normalised floating point numbers (i.e. at least 1.0 and less than 2.0). Consequently, once scaling has been performed, the divisor is approximately 1. Given these restrictions, the first digit will be positive (i.e. for a radix of four, the digit will be +1 or +2).

The remainder is given by the equation:

$$\text{rem}[i+1] = 4\text{rem}[i] - dq_{i+1}$$

Where rem[i+1] is the remainder for the next iteration, rem[i] is the remainder from the previous iteration, d is the scaled divisor, and $q_{i+1}$ is the digit from the current iteration. Again, as before, rem[0] is simply the scaled dividend itself.

In the embodiment shown in FIG. 3, the value of $q_{i+1}$ is either 1 or 2 (as previously discussed). Consequently, the second part of the equation is either the scaled divisor (d) or the scaled divisor shifted once to the right (2d), and which of these depends on the output of the quotient digit selection circuitry 190. A multiplexer 210 therefore takes as inputs the scaled divisor produced by the divisor scaling circuitry and the scaled divisor shifted once to the left, and uses the output of the quotient digit selection circuitry 190 as a selection signal. The first part of the equation is four multiplied by rem[i], which again is simply the scaled dividend. Accordingly, this can be derived from the output of the dividend scaling circuitry by either performing a $\log_2(r)$ left shift, or else simply taking the bits as the most significant bits. For example, in a case of radix-4, a 2-bit left shift can be performed, or the two most significant bits can be discarded. These two parts can be combined in order to represent the remainder after the first iteration as a positive word (the first part) and a negative word (the second part) using redundant representation.

Accordingly, the quotient digit selection occurs substantially in parallel with the addition circuitry 250a, 250b. This is then used, together with the output of the addition circuitry 250a from the divisor scaling circuitry in order to produce the negative word of the remainder and the scaled dividend is used to produce the positive word of the remainder. The remainder is therefore provided in redundant representation. This remainder, the first digit $q_1$, the scaled divisor, and the scaled dividend (forming part of the remainder) are then provided to iterative circuitry as previously discussed.

Figure 4:
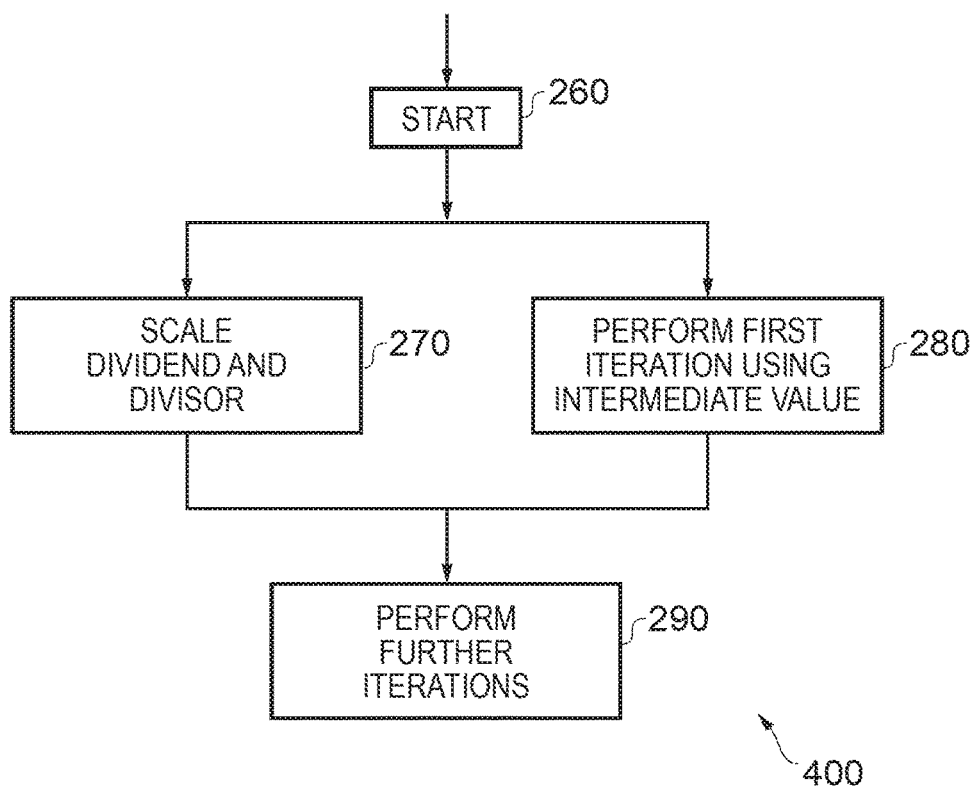
FIG. 4 illustrates a flow-chart showing a method of data processing in accordance with one embodiment.

FIG. 4 illustrates a flow chart showing a method for data processing in accordance with one embodiment. The process starts at step 260 in which a divisor and a dividend are both provided in normalised form. The dividend and the divisor are both scaled in step 270 as previously discussed. In parallel, or substantially in parallel, in a step 280, a first iteration of the digit recurrence algorithm is performed using an intermediate value produced during the scaling process performed in step 270. Once these steps are complete, at step 290, further iterations are performed.

As a consequence of the above, the process of pre-scaling can occur substantially in parallel with (e.g. at least partly overlap) the process of performing the first iteration of the digit recurrence algorithm. In the above examples, a 2:1 multiplexer has been added to the critical path. However, at least some degree of parallelisation has been achieved.

As previously discussed, the circuitry that has been described has assumed that a radix of four is used. Similar circuitry can be used for other radices such as 8 and 16.

In the case of radix 8, the number of components used in the scaling (e.g. by the component selection circuitry) is larger than 3, and depends on the desired range of the prescaled divisor. As the number of components is larger than 3, a tree of 3-to-2 CSAs are used. For example, if the number of components is 7, 4 levels of 3-to-2 CSA are provided to reduce the addition of 7 components to redundant representation divisor (and dividend). Afterwards, an adder is provided to get the non-redundant divisor (and dividend).

Radix 16 can be thought of as a particular case of radix 4, because usually the radix 16 quotient digit is decomposed into two radix 4 digits and each radix 16 iteration is implemented as two radix 4 iterations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus configured to perform a digit-recurrence division operation to determine a quotient as a result of dividing a dividend by a divisor, the data processing apparatus comprising:
   scaling circuitry to scale said dividend and said divisor by a factor to produce a scaled dividend and a scaled divisor;
   iterative circuitry to perform one or more iterations of said digit-recurrence division operation on said scaled dividend and said scaled divisor, each iteration producing a digit of said quotient and a remainder value, wherein said remainder value is provided as an input to said iterative circuitry for a subsequent iteration; and initialisation circuitry to perform a first iteration before said one or more iterations and to provide said digit of said quotient after said first iteration, wherein:

said initialisation circuitry is configured to receive, as an input, an intermediate value produced by said scaling circuitry while scaling said dividend, and operation of said initialisation circuitry is configured to at least partly overlap with operation of said scaling circuitry.

2. A data processing apparatus according to claim 1, wherein said intermediate value is said scaled dividend in redundant representation.

3. A data processing apparatus according to claim 1, wherein said scaling circuitry comprises dividend scaling circuitry to scale said dividend by said factor to produce said scaled dividend;

said dividend scaling circuitry comprises component selection circuitry to select a subset of components from a set of components, and addition circuitry to add said subset of components together to produce said scaled dividend, wherein each component in said set of components is equal to said dividend divided by a power of two.

4. A data processing apparatus according to claim 3, wherein said addition circuitry comprises a carry save adder to add said subset of components to produce said intermediate value; and said addition circuitry comprises an adder to convert said intermediate value into said scaled dividend.

5. A data processing apparatus according to claim 1, wherein said factor is selected in dependence on said divisor and a radix of said digit-recurrence division operation.

6. A data processing apparatus according to claim 1, wherein said factor is selected such that said scaled divisor is in the range [1−1/64, 1+1/8].

7. A data processing apparatus according to claim 1, wherein said initialisation circuitry is configured to provide said digit before said scaling circuitry provides said scaled dividend.

8. A data processing apparatus according to claim 1, wherein said initialisation circuitry is configured to additionally provide said remainder after said first iteration, based on said scaled divisor and said digit.

9. A data processing apparatus according to claim 8, wherein said initialisation circuitry is configured to provide said remainder after said scaling circuitry provides said scaled divisor.

10. A method of data processing to determine a quotient as a result of dividing a dividend by a divisor, the method comprising:

scaling, using scaling circuitry, said dividend and said divisor by a factor to produce a scaled dividend and a scaled divisor;

performing, using iterative circuitry, one or more iterations of a digit-recurrence division operation on said scaled dividend and said scaled divisor, each iteration producing a digit of said quotient and a remainder value, wherein said remainder value is provided as an input to said iterative circuitry for a subsequent iteration; and using, in a first iteration before said one or more iterations, an intermediate value produced during said scaling of said dividend, as an input to provide said digit of said quotient after said first iteration, wherein the first iteration is performed at least partly overlapping with the scaling of said dividend.

11. A data processing apparatus configured to perform a digit-recurrence division operation to determine a quotient as a result of dividing a dividend by a divisor, the data processing apparatus comprising:

means for scaling said dividend and said divisor by a factor to produce a scaled dividend and a scaled divisor;

means for performing one or more iterations of said digit-recurrence division operation on said scaled dividend and said scaled divisor, each iteration producing a digit of said quotient and a remainder value, wherein said remainder value is provided as an input for a subsequent iteration, means for performing a first iteration before said one or more iterations and to provide said digit of said quotient after said first iteration, wherein:

said means for performing a first iteration is configured to receive, as an input, an intermediate value produced by said means for scaling while scaling said dividend, and operation of said means for performing a first iteration is configured to at least partly overlap with operation of said means for scaling.

* * * * *